United States Patent [19]
Hosono et al.

[11] Patent Number: 6,007,090
[45] Date of Patent: Dec. 28, 1999

[54] AIR BAG DEVICE FOR A MOTORCYCLE

[75] Inventors: Soichiro Hosono; Tomohiko Akashi; Satoshi Iijima, all of Saitama, Japan

[73] Assignee: Honda Giken Kogyo Kabushiki Kaisha, Tokyo, Japan

[21] Appl. No.: 08/900,841

[22] Filed: Jul. 25, 1997

[30] Foreign Application Priority Data

Jul. 25, 1996 [JP] Japan ..................... 8-195919

[51] Int. Cl.$^6$ ............................. B60R 21/22
[52] U.S. Cl. ..................... 280/730.2; 280/728.2
[58] Field of Search ............. 280/730.1, 730.2, 280/728.2, 733, 743.2

[56] References Cited

U.S. PATENT DOCUMENTS

| | | | |
|---|---|---|---|
| 3,930,667 | 1/1976 | Osuchowski et al. | 280/730.1 |
| 4,227,717 | 10/1980 | Bouvier | 280/730.2 |
| 5,362,101 | 11/1994 | Sugiura et al. | 280/743.2 |
| 5,609,363 | 3/1997 | Finelli | 280/743.2 |
| 5,636,862 | 6/1997 | Cheung et al. | 280/743.2 |

FOREIGN PATENT DOCUMENTS

| | | |
|---|---|---|
| 85 08646 U1 | 6/1985 | Germany. |
| 91 14743 U1 | 2/1992 | Germany. |
| 93 10544 U1 | 9/1993 | Germany. |
| 195 19297 A1 | 12/1995 | Germany. |

*Primary Examiner*—Paul N. Dickson
*Attorney, Agent, or Firm*—Birch, Stewart, Kolasch & Birch, LLP

[57] ABSTRACT

An air bag device for a motorcycle deploys to cushion an impact to a rider of the motorcycle during a collision. The air bag device is mounted to a body frame of the motorcycle in front of the rider. Bag anchoring members provide a connection between the air bag and the body frame. During deployment of the air bag, the bag anchoring members deploy from grooves in the motorcycle's fuel tank, and extend together with the air bag to hold the air bag securely to the frame body.

17 Claims, 7 Drawing Sheets

AIR BAG DEVICE FOR A MOTORCYCLE

BACKGROUND OF THE INVENTION

1. Field of the Invention

The present invention relates to an air bag device for a motorcycle. Should a collision occur, the air bag device will cushion an impact to a rider of the motorcycle.

2. Description of Background Art

Currently, many automobiles, such as passenger cars, include an air bag device. The air bag device has been adopted as one tool for cushioning an impact to a rider should the automobile suffer a collision. Because of the impact cushioning effect exhibited by air bag devices, use of air bags in the automobile industry is wide spread.

The popularity of air bag devices in the automobile industry has created a desire among consumers for the development of an air bag device for motorcycles. Therefore, there exists a need for an air bag device, which can be used in conjunction with a motorcycle, to provide an impact cushioning effect for a rider in the event of a collision.

SUMMARY AND OBJECTS OF THE INVENTION

On a motorcycle, a rider is not surrounded by a passenger compartment, as in an automobile, but is in an open atmosphere. If the rider is to be restrained by an air bag, the volume of the air bag when expanded must be as large as possible. Also, special consideration must be given to a mounting location of the air bag. Further, a mounting assembly, connecting the air bag to the motorcycle body, must have sufficient strength.

It is an object of the present invention to provide an air bag device for a motorcycle which meets the above-mentioned criteria.

According to the present invention, there is provided an air bag device for a motorcycle, including an air bag. The air bag being capable of expanding in an upward direction. At least one flexible, bag anchoring member is connected to the air bag and connectable to a frame member of the motorcycle to attach the air bag to the frame member of the motorcycle. The at least one flexible, bag anchoring member is capable of extending in the upwards direction along with the air bag.

Also according to the present invention, there is provided a motorcycle in combination with an air bag device, the combination including an air bag. The air bag being capable of expanding in an upward direction. A frame member being a component part of the motorcycle. At least one flexible, bag anchoring member connected to the air bag and connected to the frame member of the motorcycle. The at least one flexible, bag anchoring member attaching the air bag to the frame member of the motorcycle. The at least one flexible, bag anchoring member being capable of extending in the upward direction along with the air bag.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
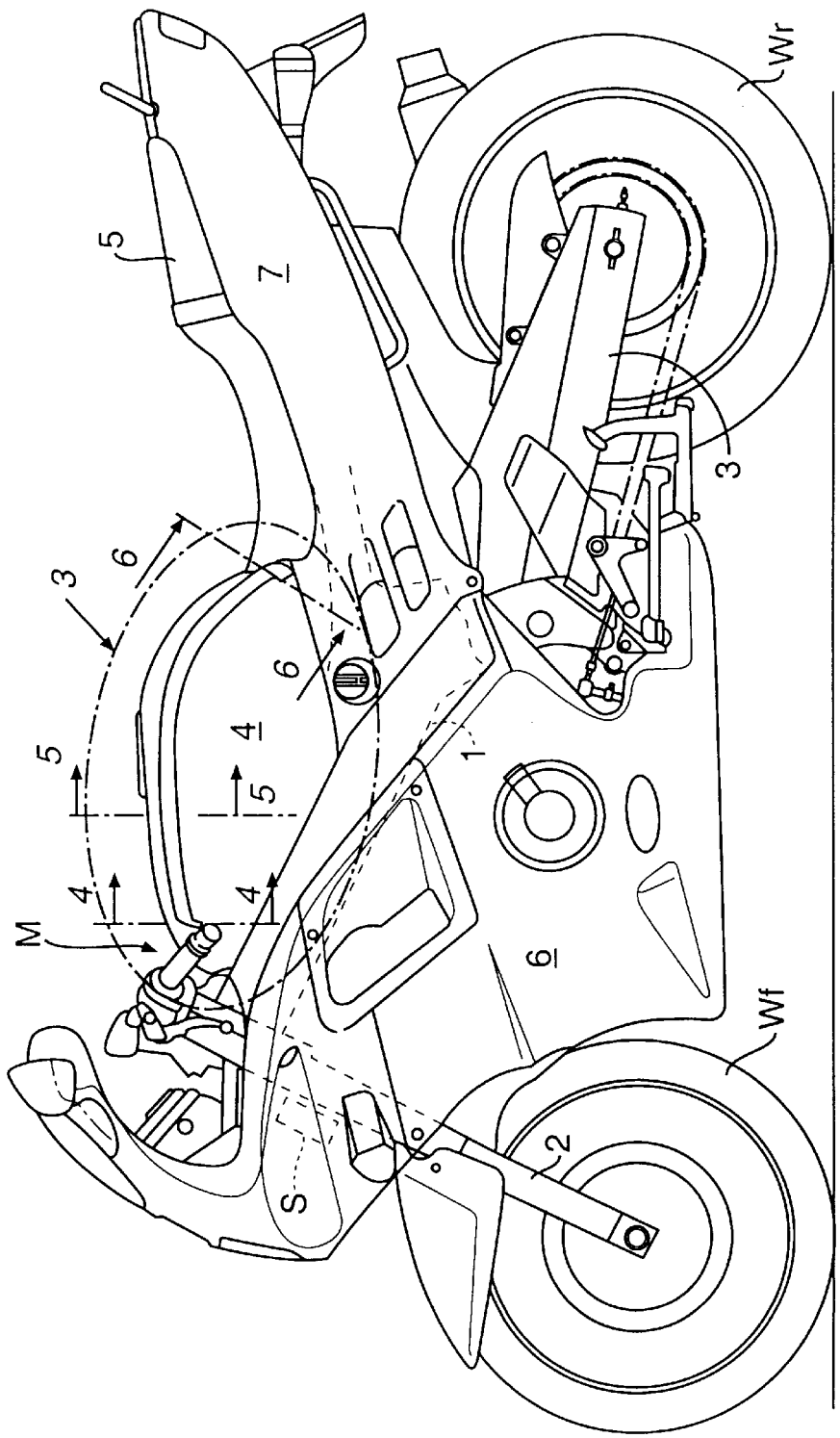
FIG. 1 is a side view of a motorcycle equipped with an air bag device embodying the present invention.
Figure 2:
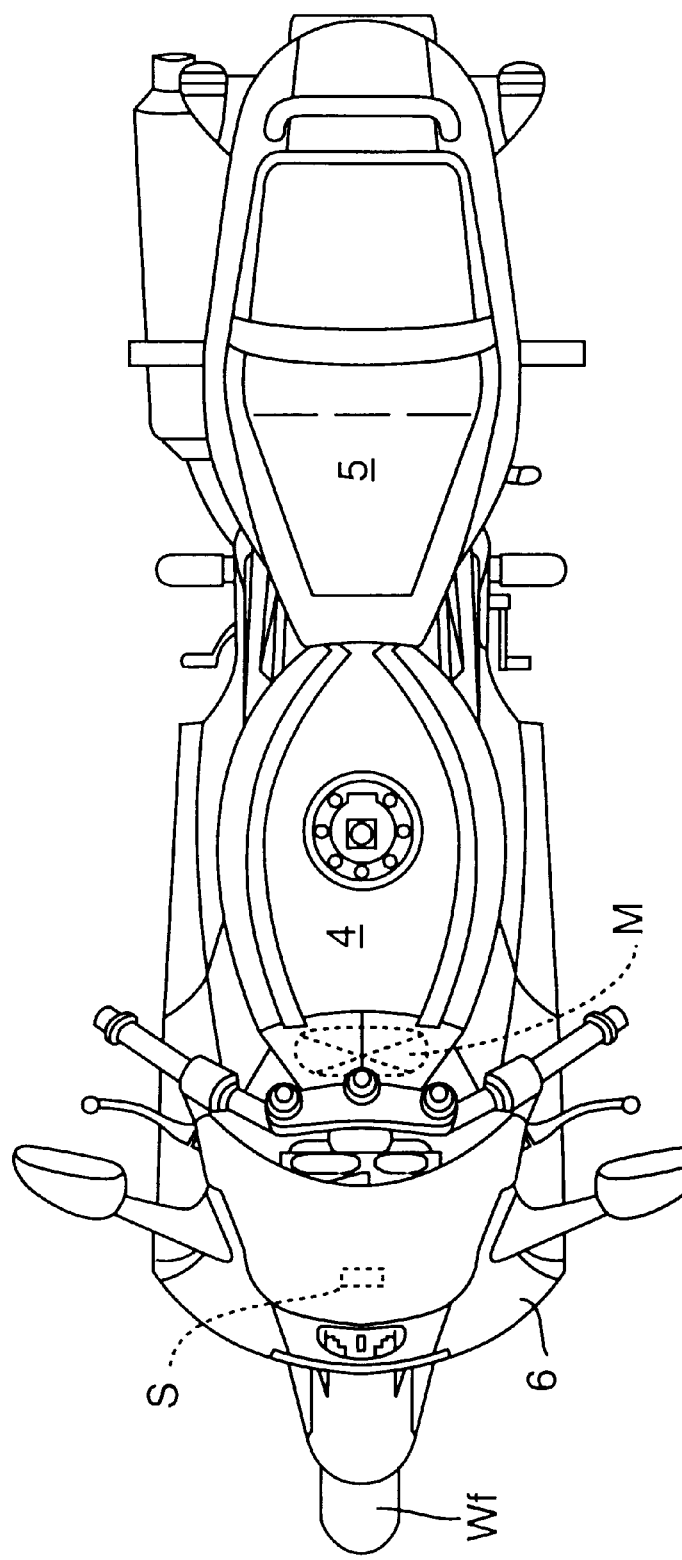
FIG. 2 is a plan view of the motorcycle.

In FIGS. 1 and 2, a front fork 2 is supported by a front portion of a body frame 1 of a motorcycle. The front fork is moveable relative to the body frame 1 so as to enable steering of the motorcycle. A front wheel Wf is rotatably supported by the front fork 2. Swing arms 3 are supported by a rear portion of the body frame 1. Swing arms 3 are vertically swingably relative to the body frame 1. A rear wheel Wr is supported by the swing arms 3.

A fuel tank 4 is mounted on top of a front half portion of the body frame 1. A seat 5 is mounted on seat rails on top of a rear half portion of the body frame 1. Due to the vertically swingable nature of the swing arms 3, the seat 5 can rise and fall relative to a roadway surface. The greater part of the body frame 1 is covered with a front cowl 6 and a rear cowl 7.

A space is formed between the front portion of the fuel tank 4 and a top bridge of the front forks 2, and an air bag module M, of the air bag device embodying the invention, is disposed in the space.

Now, the structure of the air bag module M and a mounting structure for mounting the air bag module M to the body frame 1, will be described, mainly with reference to FIGS. 3 to 6. A mounting stay 10 is fixed to an upper surface of the body frame 1 in a position between the front portion of the fuel tank 4 and the top bridge of the front forks 2. The bag housing 12 includes a lower open portion secured onto the mounting stay 10 by a mounting piece 11. The bag housing 12 is formed in the shape of a cap and constructed of a lightweight material, such as a synthetic resin.

The bag housing 12 includes a receptacle portion $12_1$ and a cover portion $12_2$. The receptacle portion $12_1$ is capable of containing an air bag 14 in a folded state. The cover portion covers an upper open portion of the receptacle portion $12_1$. The cover portion $12_2$ is connected to the receptacle portion $12_1$ by a hinge portion $12_3$. The hinge portion $12_3$ is provided on one side of the cover portion $12_2$. The remaining sides of the cover portion $12_2$ are sealed to surrounding structures by a fragile portion $12_4$. The fragile portion $12_4$ bursts easily when an impact force larger than a predetermined value is applied to the cover portion $12_2$.

Figure 8:
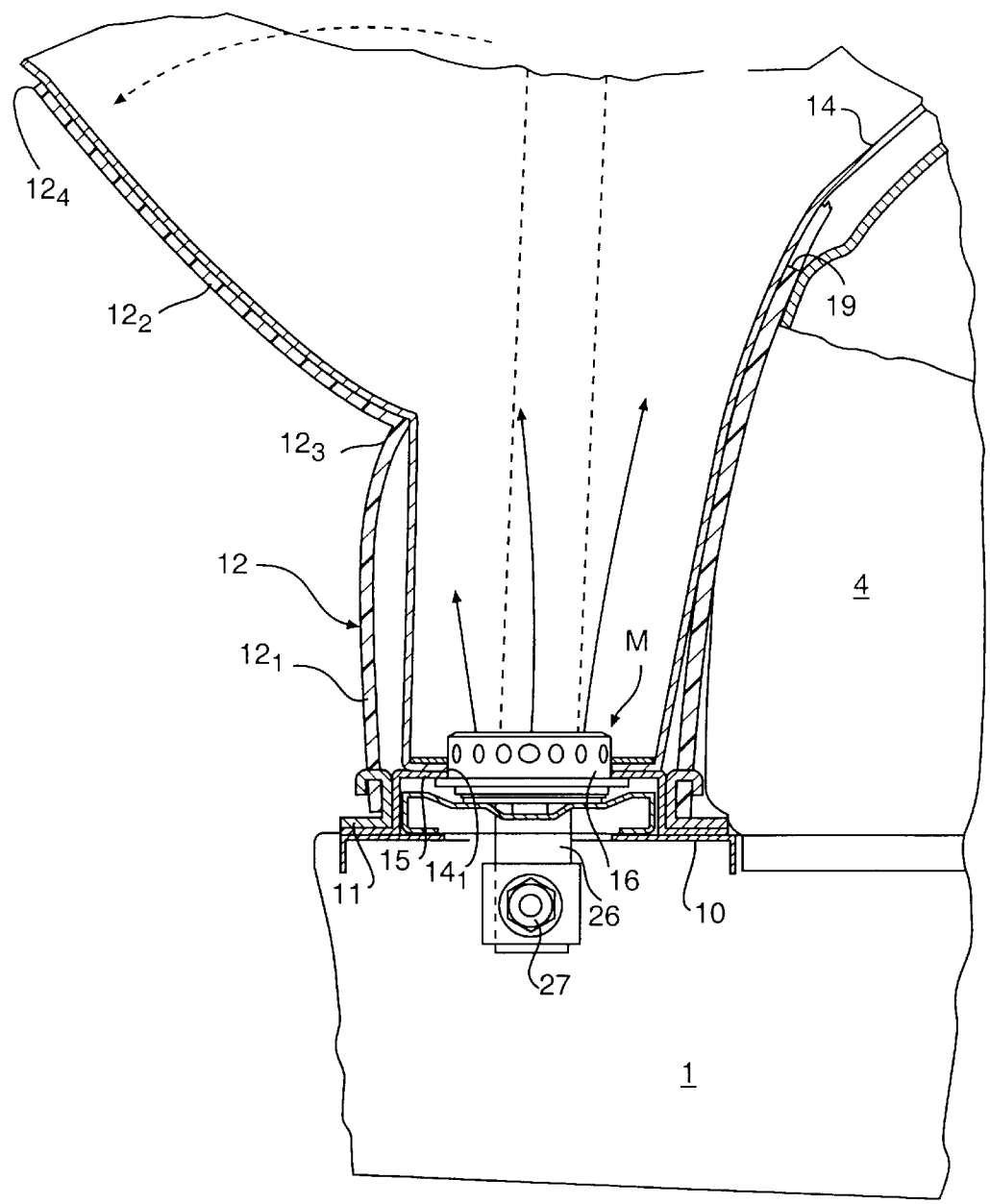
FIG. 8 is a cross-sectional view of the air bag in the expanded state.

As shown in FIG. 8, when an impact force larger than the predetermined value acts on the motorcycle, the air bag 14 expands and the fragile portion $12_4$ bursts. After the fragile portion $12_4$ bursts, the cover portion $12_2$ opens upwardly, with the hinge portion $12_3$ acting as a fulcrum for the cover portion $12_2$. Therefore, the air bag 14 is permitted expand substantially upwards and beyond the bag housing 12.

The air bag module M is fixed to the mounting stay 10. The air bag module M includes an inflator 16 which generates a gas for expanding the air bag. The air bag 14 is formed in the shape of a bag having an open bottom $14_1$. The air bag 14 is contained in the bag housing 12 in a folded state. A mouthpiece 15 is fixed to the open bottom $14_1$. The inflator 16 is fixed in an airtight manner to the mouthpiece 15. The inflator 16 is also directly fixed to the mounting stay 10.

The air bag 14 is a base cloth constructed of a polyamide material, superior in tensile strength. A coating material is applied to the base cloth to prevent gas leakage. A vent hole 17 is formed in the air bag 14 at an appropriate position to controllably allow gas inside the air bag 14 to escape. The inflator 16 can be of any known type, such as, a gas type, a solid type, a mixing gas type, or an air suction type.

A pair of bag anchoring members 18, 18 are constructed of a flexible material having a sufficient tensile strength to prevent separation of the air bag 14 from the body frame 1. The pair of bag anchoring members 18, 18 may be in the form of strings, belts, films, or sheets of material. As an alternative, the pair of bag anchoring members 18, 18 can be replaced with a single continuous bag anchoring member.

Preferably, the bag anchoring members 18, 18 are formed of a material having both flexibility and elasticity, which does not require a large space and is capable of being folded easily. The bag anchoring members 18, 18 may be formed by a single material or by a laminate of plural materials. For example, the same material or materials used in the construction of the base cloth of the air bag 14 may also be used to construct the pair of bag anchoring members 18, 18.

Figure 3:
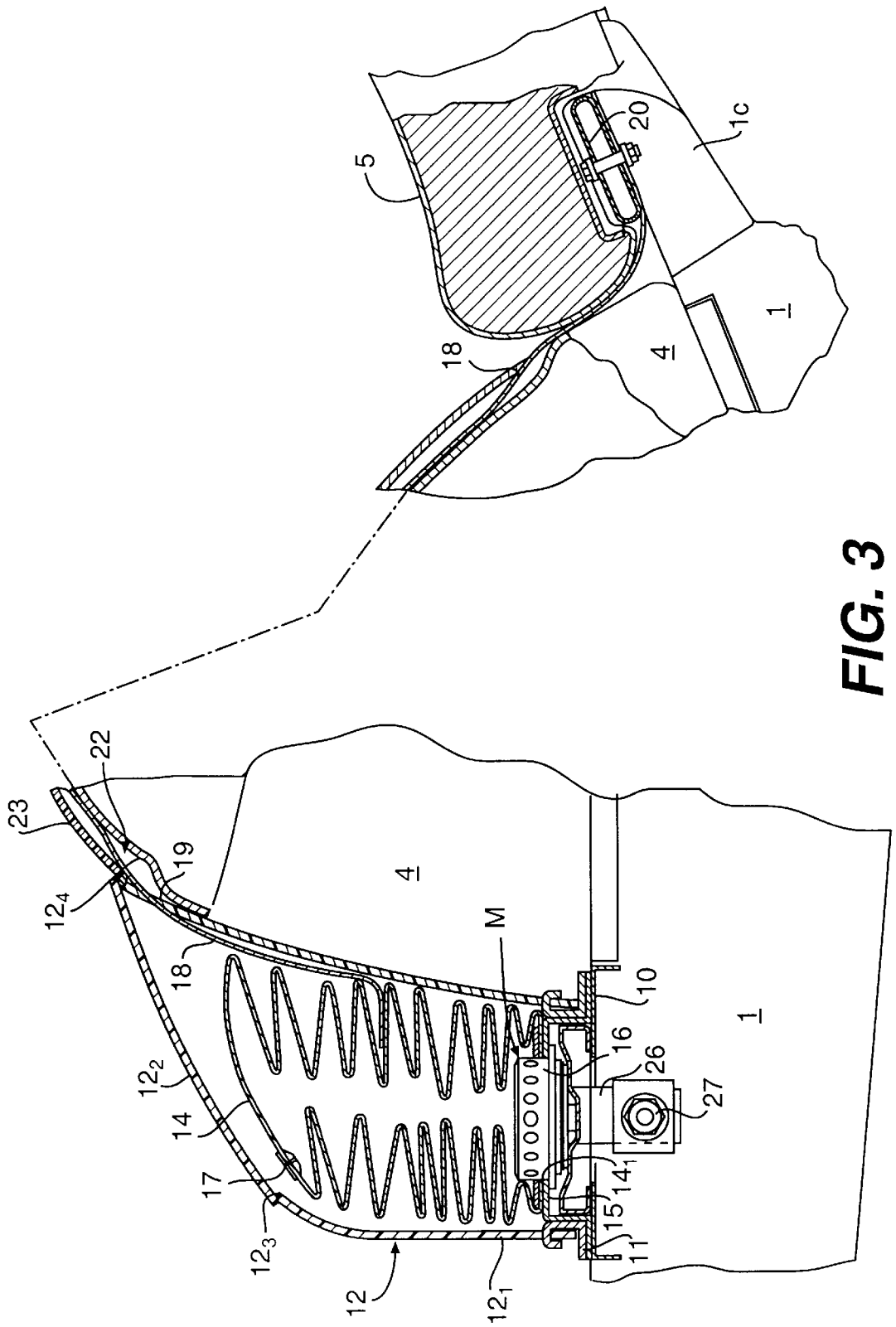
FIG. 3 is a partially omitted, cross-sectional view of the portion surrounded with a chain line and indicated by arrow 3 in FIG. 1.

As shown in FIG. 3, the pair of bag anchoring members 18, 18 have respective free ends connected to a middle portion of the rear side of the air bag 14. The bag anchoring members 18, 18 include portions inside the bag housing 12 in a folded state. The bag anchoring members 18, 18 also include portions exterior of the bag housing 12, each portion exiting the bag housing 12 through an outlet 19 formed in the rear wall of the bag housing 12. The bag anchoring members 18, 18 are directed past both the right and left sides of the fuel tank 4. Then, the respective other free ends of the bag anchoring members 18, 18 are extended to below the seat 5. At a position just under the front portion of the seat 5, each respective other free end is secured to a mounting piece 20 which is connected to a cross member 1c of the body frame 1. The respective other free ends are connected to the cross member 1c by bolts or other similar connecting devices. By the above attachment of the bag anchoring members 18, 18, the mounting between the air bag device and the body frame 1 is strong and neat in appearance.

The fuel tank 4 includes right and left receptacle grooves 22, 22 for receiving the bag anchoring members 18, 18. The right and left receptacle grooves 22, 22 extend across the overall length of the fuel tank.

Figure 5:
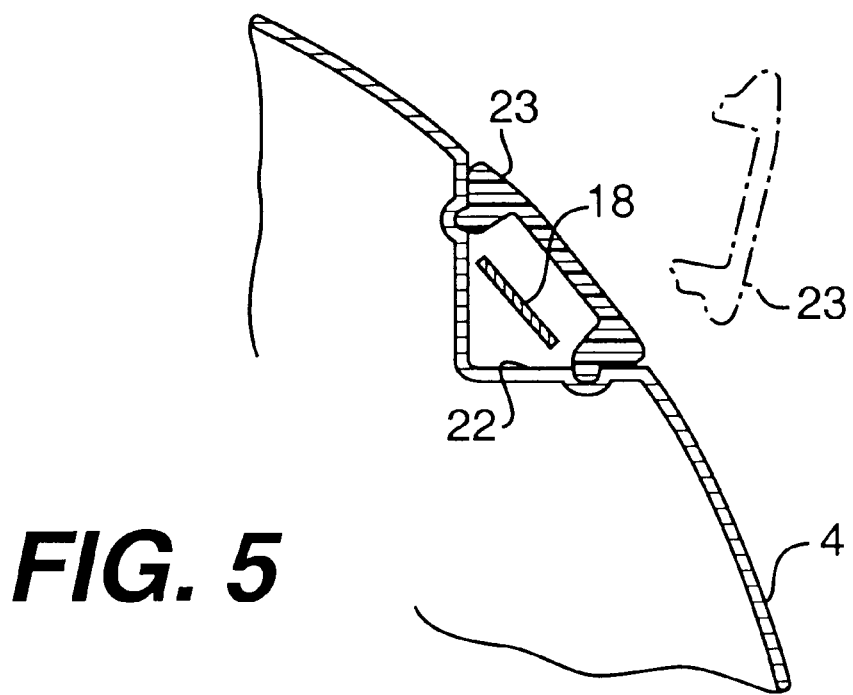
FIG. 5 is a cross-sectional view taken along line 5—5 in FIG. 1.

As shown in FIG. 5, the receptacle grooves 22, 22, in a middle of the tank 4, each have a V-shaped cross-section and their upper open sides are covered with covers 23, 23. Covers 23, 23 are formed of a material having elasticity, such as a synthetic resin. Covers 23, 23, are connected to the upper open sides of receptacle grooves 22, 22 by a pressure fit engagement. When the air bag is deployed, the covers 23, 23 are contacted by the bag anchoring members 18, 18. This contact is sufficient to disengage the covers 23, 23, from the receptacle grooves 22, 22 and allow the bag anchoring members 18, 18 to exit the receptacle grooves 22, 22.

Figure 4:
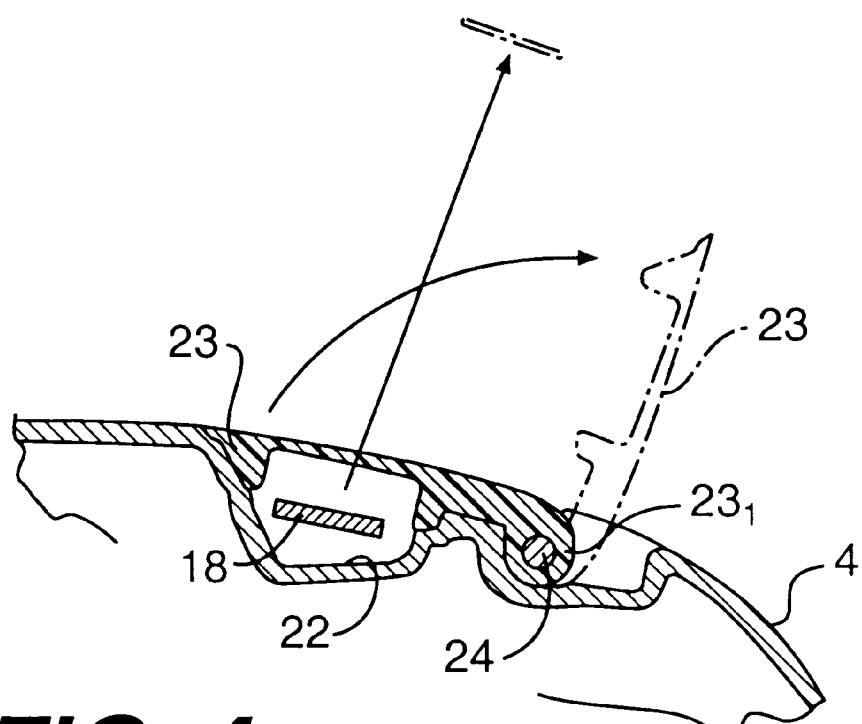
FIG. 4 is a cross-sectional view taken along line 4—4 in FIG. 1.

FIG. 4 illustrates the receptacle grooves 22, 22 and covers 23, 23 near a front of the tank 4. As shown in FIG. 4, one end of each of the covers 23, 23 is extended and includes an integrally formed hinge portion $23_1$. The hinge portion $23_1$ is pivotally connected to the outer wall of the fuel tank 4 by a hinge pin 24.

Figure 6:
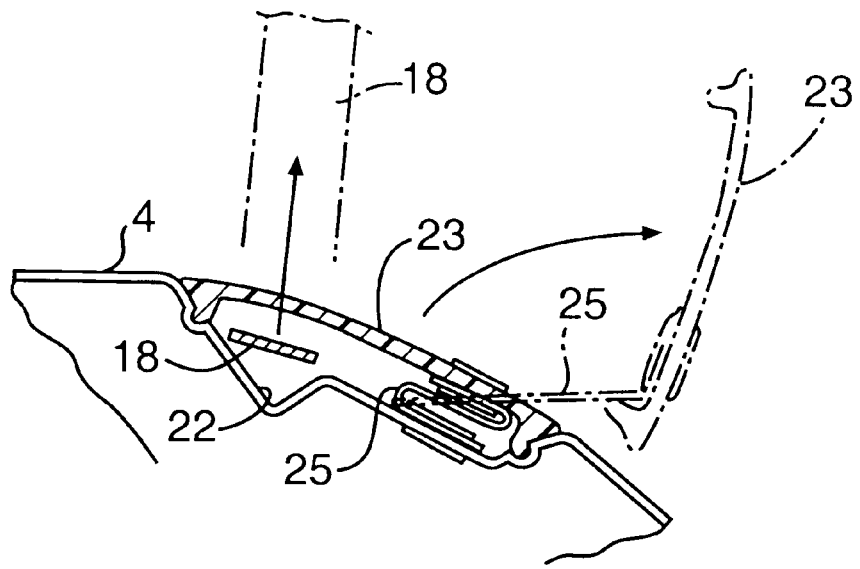
FIG. 6 is a cross-sectional view taken along line 6—6 in FIG. 1.

FIG. 6 illustrates the receptacle grooves 22, 22 and covers 23, 23 near a rear of the tank 4. As shown in FIG. 6, one end of each of the covers 23, 23 is connected to the fuel tank 4 by a flexible line member 25. The flexible line member 25 may be in the form of a wire, string, belt, or other similar tether.

Normally, bag anchoring members 18, 18 are received in the receptacle grooves 22, 22, as indicated by the solid line in FIGS. 4 to 6. When the air bag is deployed, the covers 23, 23 are contacted by the bag anchoring members 18, 18. This contact is sufficient to disengage the covers 23, 23 from the receptacle grooves 22, 22. At this point, the bag anchoring members 18, 18 exit the receptacle grooves 22, 22, as indicted by the chain lines of FIGS. 4 to 6, and extend upwardly together with the expanded air bag 14.

As shown in FIG. 3, a pair of right and left, guide and support pieces 26, 26 are fixed at their lower ends to the right and left sides of the body frame 1 by a bolt and nut arrangement 27. It should be understood that the guide and support pieces 26, 26 could also be fixed to the body frame 1 by alternative devices. Like the bag anchoring members 18, 18, the guide and support members 26, 26 may also be formed in the shape of a belt using a flexible material. The guide and support pieces 26, 26 extend into the bag housing 12 and have respective upper ends fixed to right and left outer faces of the air bag 14. Upon expansion of the air bag 14, the guide and support pieces 26, 26 extend together with the air bag and guide the air bag so that the air bag expands substantially above the body frame 1.

As shown in FIG. 1, a shock sensor S such as a G-force sensor is provided at the front portion of the body frame 1. In response to a signal provided from the shock sensor S, the inflator 16 is operated and ejects a high pressure gas into the air bag 14.

The operation of the air bag device, according to the invention, will now be described. Should the motorcycle strike against an obstacle, the shock sensor S detects the collision and sends a signal indicating the collision to the inflator 16. The inflator 16 generates a high-pressure gas. The gas is fed into the folded air bag 14 through the open bottom $14_1$ causing the air bag to expand.

Figure 7:
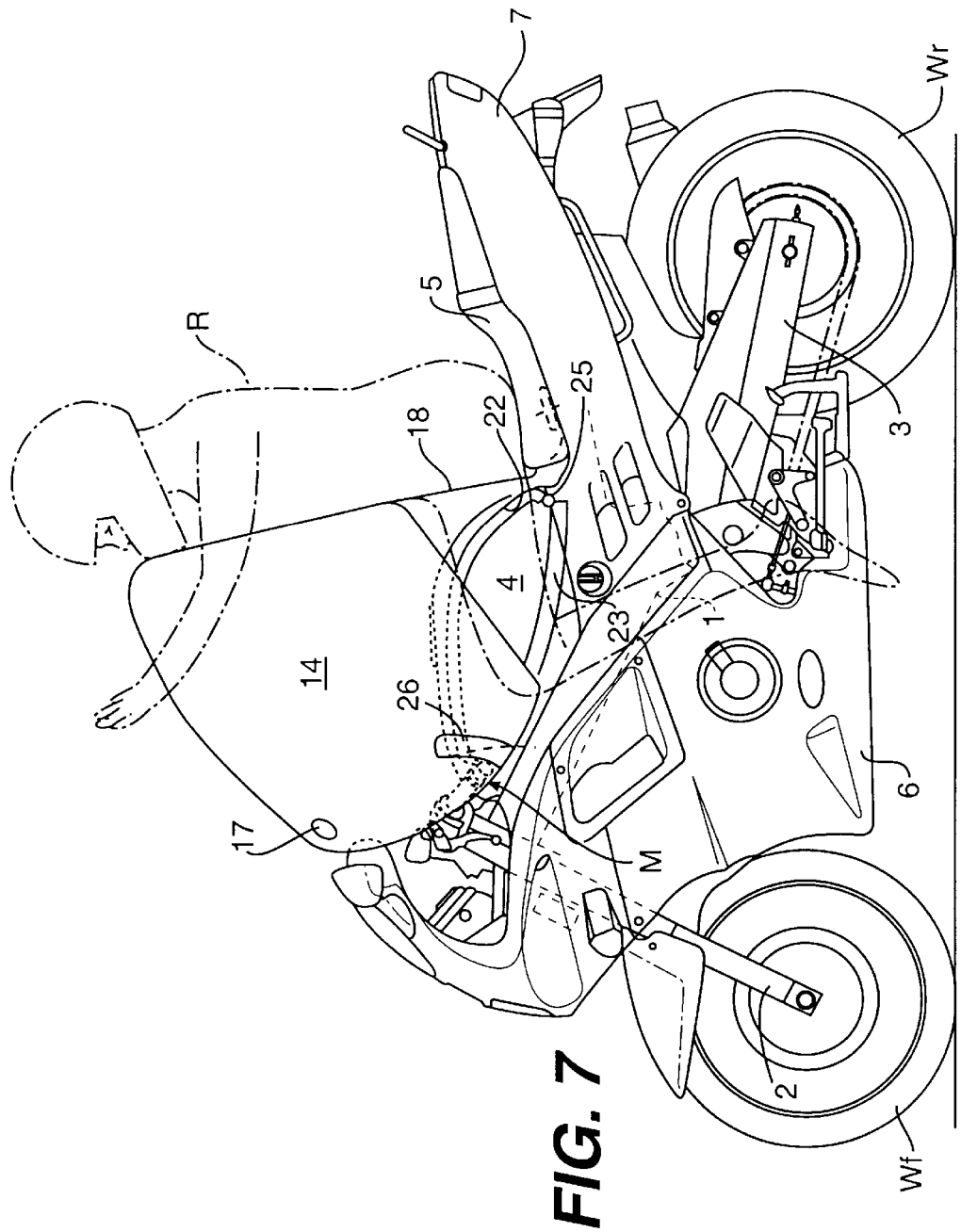
FIG. 7 is a side view of the motorcycle having the air bag in an expanded state.

As shown in FIGS. 7 and 8, the air bag expands approximately upwards. The upwards movement of the air bag 14 causes the bag anchoring members 18, 18 to be pulled upwards. The bag anchoring members 18, 18 open the covers 23, 23 and exit the receptacle grooves 22, 22 while extending upwards with the air bag 14. The flexible right and left, guide and support pieces 26, 26 also extend together with the air bag 14 and guide the upwards expansion of the air bag 14.

Since the air bag 14 is anchored to the body frame 1 under the seat 5 by the flexible bag anchoring members 18, 18, the air bag 14 is held at a position which faces the rider R, as shown in FIG. 7. This facing relationship, restrains the rider and cushions impacts directed to the rider. After deployment of the air bag 14, the high-pressure gas present in the air bag 14 is discharged slowly to the exterior through the vent hole 17.

Since the bag anchoring members 18, 18, mounting the air bag 14 to the body frame 1, are flexible and elastic, the bag anchoring members 18, 18 can expand to provide addition cushioning to the rider R during an impact. Further, the flexible and elastic nature of the bag anchoring members 18, 18 diminishes the tensile force and shear force exerted on the cross member 1c when the rider R contacts the deployed air bag 14.

Figure 9:
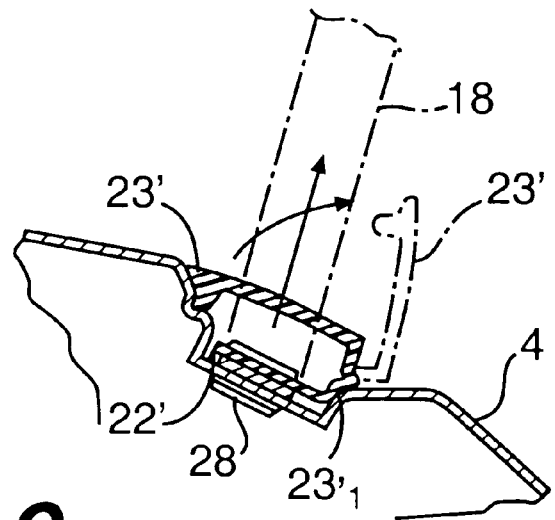
FIG. 9 is a cross-sectional view of a cover for a groove in a fuel tank of the motorcycle.

FIG. 9 illustrates an alternative embodiment of the receptacle grooves 22, 22 and covers 23, 23. As shown in FIG. 9, receptacle grooves 22', 22' are concave in crosssection and are formed in the right and left side faces of the fuel tank 4. The bag anchoring members 18, 18 are received into the receptacle grooves 22', 22'. Right and left covers 23', 23' close upper open sides of the right and left receptacle grooves 22', 22'.

By contrast to the previous embodiment, the covers 23', 23' are fixed to the bottoms of the grooves 22', 22' by a plurality of fixing means 28. Each cover 23' is formed of a soft material such as a synthetic resin. A hinge portion $23_1$ is formed integrally with each cover 23'. The hinge portion $23_1$ acts as a fulcrum to allow the cover 23' to open in a manner similar to the embodiment of FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motorcycle in combination with an air bag device comprising:
    an air bag, said air bag being capable of expanding in an upward direction;
    a frame member of said motorcycle; and
    right and left flexible, bag anchoring members connected to said air bag and connected to said frame member of said motorcycle, said right and left flexible, bag anchoring members attaching said air bag to said frame member of said motorcycle, and said right and left flexible, bag anchoring members being capable of extending in the upward direction along with said air bag.

2. The motorcycle in combination with an air bag defined in claim 1, wherein said frame member of said motorcycle is located below a seat of said motorcycle.

3. The motorcycle in combination with an air bag defined in claim 1, wherein said frame member of said motorcycle is a cross member.

4. The motorcycle in combination with an air bag defined in claim 1, wherein said right and left flexible, bag anchoring members extend in an extension direction away from said air bag, the extension direction being opposite to a forward direction of travel of said motorcycle.

5. The motorcycle in combination with an air bag defined in claim 1, further comprising:
    a right groove and a left groove in a fuel tank of said motorcycle, said right groove and said left groove receiving a portion of said right and left flexible, bag anchoring members intermediate the connections between said right and left flexible, bag anchoring members and said air bag and the connections between said right and left flexible, bag anchoring members and said frame member, respectively.

6. The motorcycle in combination with an air bag defined in claim 5, further comprising:
    a right cover and a left cover for covering said portions of said right and left flexible, bag anchoring members while said portions of said right and left flexible, bag anchoring members are received in said right and left grooves in said fuel tank of said motorcycle, respectively.

7. The motorcycle in combination with an air bag defined in claim 1, wherein said right and left flexible, bag anchoring members are made in the form of belts and constructed of an elastic material.

8. A motorcycle in combination with an air bag device comprising:
    an air bag, said air bag being capable of expanding in an upward direction;
    a frame member of said motorcycle; and
    at least one guide and support piece, said at least one guide and support piece being connected to right and left side faces of said air bag and being connected to said frame member of said motorcycle.

9. The motorcycle in combination with an air bag defined in claim 8, wherein said frame member of said motorcycle is located below a seat of said motorcycle.

10. The motorcycle in combination with an air bag defined in claim 8, wherein said frame member of said motorcycle is a cross member.

11. The motorcycle in combination with an air bag defined in claim 8, wherein said at least one guide and support piece is made in the form of a belt and constructed of an elastic material.

12. The motorcycle in combination with an air bag defined in claim 8, wherein said at least one guide and support piece includes right and left flexible, bag anchoring members.

13. A motorcycle in combination with an air bag device comprising:
    an air bag, said air bag being capable of expanding in an upward direction;
    a frame member of said motorcycle;
    at least one flexible, bag anchoring member connected to said air bag and connected to said frame member of said motorcycle, said at least one flexible, bag anchoring member attaching said air bag to said frame member of said motorcycle, and said at least one flexible, bag anchoring member being capable of extending in the upward direction along with said air bag; and
    at least one groove in a fuel tank of said motorcycle, said at least one groove receiving a portion of said at least one flexible, bag anchoring member intermediate the connection between said at least one flexible, bag anchoring member and said air bag and the connection between said at least one flexible, bag anchoring member and said frame member.

14. The motorcycle in combination with an air bag defined in claim 13, wherein said frame member of said motorcycle is located below a seat of said motorcycle.

15. The motorcycle in combination with an air bag defined in claim 13, wherein said frame member of said motorcycle is a cross member.

16. The motorcycle in combination with an air bag defined in claim 13, further comprising:
a cover for covering said portion of said at least one flexible, bag anchoring member while said portion of said at least one flexible, bag anchoring member is received in said at least one groove in said fuel tank of said motorcycle.

17. The motorcycle in combination with an air bag defined in claim 13, wherein said at least one flexible, bag anchoring member is made in the form of a belt and constructed of an elastic material.

* * * * *